Sept. 22, 1953  R. K. VICKERY  2,652,627
SURVEYING INSTRUMENT
Filed March 7, 1952
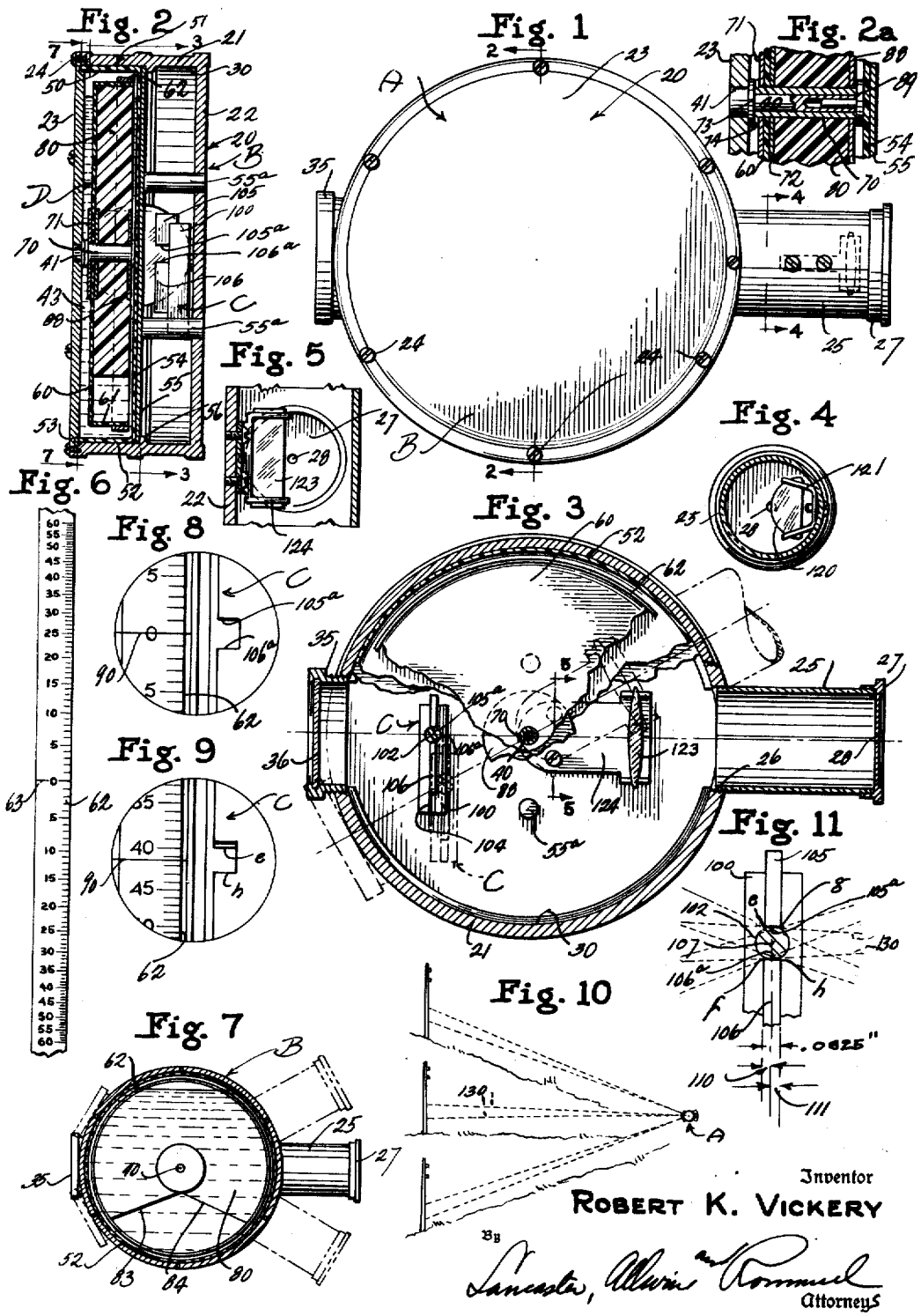
Inventor
ROBERT K. VICKERY Patented Sept. 22, 1953

2,652,627

UNITED STATES PATENT OFFICE 2,652,627

SURVEYING INSTRUMENT

Robert K. Vickery, Atlanta, Ga., assignor to Bostrom - Brady Manufacturing Company, Atlanta, Ga., a corporation of Georgia Application March 7, 1952, Serial No. 275,289

8 Claims. (Cl. 33—71)

This invention relates to improvements in surveying instruments.

A primary object of this invention is the provision of an improved instrument for the stadia measurement of heights of objects without the necessity of actual measurement of a base line.

A further object of this invention is the provision of an improved surveying instrument for determining the vertical heights of objects, viewed at eye level, or above or below eye level in angular relation with respect thereto, and having associated therewith an improved self levelling stadia index member which will enable the quick and efficient positioning of the observer at an accurate base line distance with respect to the target.

A further object of this invention is the provision of an improved self levelling stadia index for surveying instruments and the like.

A further object of this invention is the provision of a relatively simple, compact and efficient surveying instrument for the quick computation of vertical heights without the necessity of actual measurement of a base line and without the use of auxiliary equipment such as a stadia slide rule or Beaman arc.

Other objects and advantages of this invention will be apparent during the course of the following detailed description.

In the accompanying drawing, forming a part of this specification, and wherein similar reference characters designate corresponding parts throughout the several views:

Figure 1 is a left side elevation of the improved instrument.

Figure 2 is a vertical cross sectional view taken thru the instrument, substantially on the line 2—2 of Figure 1, and more particularly showing therein a floating dial and self levelling stadia index.

Figure 2ª is an enlarged cross sectional view taken thru the pivot location of the floating dial wheel.

Figure 3 is a cross sectional view taken substantially on the line 3—3 of Figure 2.

Figure 4 is a transverse cross sectional view taken thru the sight tube substantially on the line 4—4 of Figure 1.

Figure 5 is a cross sectional view taken substantially on the line 5—5 of Figure 3, showing more particularly a magnifying lens between the eye piece sight tube and self levelling index for observation of the stadia indicia upon the latter.

Figure 6 is a developed view of the scale upon the rotary dial wheel.

Figure 7 is reduced cross sectional view taken substantially on the line 7—7 of Figure 2, showing more particularly the construction of the floating dial, and in dot and dash lines showing the position of the sight tube for angle measurements above and below eye level.

Figure 8 is an enlarged sight view of the scale of the floating dial, showing its index line in reference thereto, and in the same line of sight showing the stadia index as when sighting at eye level on a horizontal line.

Figure 9 is a view similar to Figure 8, but with the observers line of sight above eye level, that is in angular position with respect to the horizontal, and more particularly showing the improved stadia indexes and the elevation reading upon the dial scale.

Figure 10 is a diagrammatic view showing how the instrument can be used for sighting upon targets at eye level, and above and below eye level.

Figure 11 is a somewhat diagrammatic view showing the improved indexes of the self levelling stadia member, and in dotted lines showing which stadia indexes will appear in the line of the vision of an observer at eye level and above and below eye level, such as when sighting upon a target as indicated in Figure 10.

In the drawing, wherein for the purpose of illustration is shown only a preferred embodiment of the invention, the letter A may generally designate the improved surveying instrument. It includes a telescope casing structure B having disposed therein, in the line of sight, a self levelling stadia index member C and an improved rotary scale or dial wheel D.

The casing structure B preferably comprises a narrow cylindrical casing body 20 wherein the element C and D are mounted. This casing body 20 preferably comprises an annular circumferential wall 21 having a right hand side wall 22, preferably integral therewith, as shown at Figure 2. The opposite side (left) is preferably provided with a detachable wall plate 23, which may be secured to the wall 21 as by screws 24.

The casing structure B furthermore includes a white transulcent eye piece or tube 25, screw threaded at 26, in an opening in the wall 21. At its end it is provided with a cap 27 having a peep hole 28 therein. The white translucent eye piece 25 enables light to enter the casing compartment 30 for the illumination of the details therein. Diametrically opposed to the eye piece 25 there is disposed the usual glass supporting objective cap 35. It is detachable and serves principally to support the lens or glass 36 and to exclude dust, moisture and air currents, etc. from the casing compartment 30.

The rotary dial wheel D is supported in the left hand portion of the compartment 30 upon a cantilever type shaft or axle 40 supported rigidly at 41 centrally upon the closure wall 23.

The wheel D is intended to rotate within a body 43 of methanol wood alcohol. The latter is sealed in a chamber 50 provided in the left hand portion of the casing structure B as shown in Figure 2. The sealing is accomplished by providing a transparent plastic or glass casing 51 including a peripheral wall 52; the marginal edge 53 of which is sealed and seated in an annular groove at the inner side of the cover 23, as shown in Figure 2. The casing 51 has a side wall 54 which is spaced from the cover 23 and therewith provides a compartment 50 within which the alcohol is disposed and maintained in sealed relation therein against leakage therefrom.

The casing B has a preferably metal partition wall 55 therein seated against an annular retaining flange 56 formed upon the inner face of the wall 21, and it is against this rib or flange that the side wall 54 of the transparent casing 51 rests, as shown in Figure 2. The pins 55ª also aid in holding the wall 55.

Removal of the cover wall 23 from the casing B will also detach the casing 51 and the rotary dial wheel D therewith, since these parts are connected together.

The floating dial wheel D is pivoted upon the axle 40 as above mentioned. This cantilever axle 40 extends only partially across the chamber 50. The dial wheel preferably comprises a transparent plastic or glass side wall 60 having an annular scale supporting transparent rim 61 extending in right angled relation to the right side of said wall 60. Externally thereon it supports a scale tape or strip 62 having delineations at opposite sides of a dividing line 63, as shown in Figure 6. Those upon the upper half of the strip 62 are preferably in black, starting from the zero (0) line 63 and numerically increasing away therefrom, and preferably designating feet in elevation. Below the line 63 there are similar markings, but preferably in some contrasting color, such as red, designating feet measured in depression or below the normal sight line of the instrument, in accordance with such feature outlined in my co-pending application above mentioned.

The wheel structure includes a hollow hub 70 with a passageway into which the axle 40 extends, as shown in Figure 2ª, and this hub is provided with fixed flanges 71 and 72 at both sides of the dial wheel wall 60, for the purpose of reinforcing the wall 60 and providing support for the wheel. The hub 70 at the left side is provided with a flanged portion 74 extending beyond the outer face of the flange 71 for bearing frictionally against the spacing flange 73 provided upon the shaft 40 at the inner side of the casing wall 23. The right hand side of the wheel D is entirely opened, to permit the entrance thereto of the alcohol in which the wheel rotates and floats.

For the purpose of floating and levelling the wheel I prefer to provide a segmental disc 80 which is of a porous plastic material, buoyant in water and alcohol, such as "styrofoam." This segmental disc 80 is of the shape shown in Figure 7, preferably filling the inside of the dial wheel casing formed by the wall 60 and the rim 61, with the exception of a small segmental area designated by the lines 83 and 84, in Figure 7. This space segment is less than 180° and preferably greater than 90°. The porous plastic material is held in position by means of an annular disc flange 88 secured upon the right hand side of the hub 70 as shown in Figure 2ª. A short flange headed pin 89 is socketed in the right hand end of the axle 40; the head spacing the flange 88 from the inner side of the fixed casing wall 54. This provides a rather delicate support for the wheel D, in order that the latter can rotate without much frictional resistance.

The stationary rim 61 is provided with an index line 90 thereon, as shown in Figure 8, so readings can be taken upon the dial scale. The wheel D will float in the position shown in Figure 7. When the line of sight is horizontal the zero delineation of the scale, designated by the line 63 will lie flush with the index line 90. When the line of sight is above horizontal eye level the instrument readings will be taken from the scale portion of the dial tape, and when the line of sight is below the eye level horizontal, the red scale delineations will show.

Referring to the self levelling stadia line bearing member C, the same has been provided for the purpose of compelling the operator to assume a position having a correct base line measurement between the observers location and the target upon which a "shot" is being taken. This is accomplished by positioning the stadia indexes in such relation that they will close in at the correct accelerated speed to compensate for various sight angles above and below the horizontal in order that the operator, sighting upon predetermined spaced markings upon the target, must assume the correct base line distance from the target when lining up the stadia indexes with the markings upon the target. That cannot be done with conventional hair line stadia since they have no dimensional depth to speak of. With the use of hair line stadia, if a sight is taken at an angle to the horizontal, topographic dial readings will not register correctly because the horizontal or base line distance between the vertical planes thru the instrument and the target will be less than the required base line distance. The improved stadia index member C is best shown in Figures 2, 3 and 11 of the drawings. It includes a heavy body portion 100, preferably of metal, and rectangular in form. The length and depth may be uniform, and above the center of gravity, at the upper end thereof, the same is provided with a passageway receiving a pivot pin 102 which may have a slotted screw head, as shown. The latter may be detachably supported in any approved manner by the wall 22 of the casing B. The body portion 100 is preferably spaced from the inside surface of the wall 22, as shown in Figure 2, and the heavier lower portion of the body 10 renders the member C self levelling, thru gravity, as is quite obvious. The body portion 100 is preferably provided with a longitudinal retaining groove 104 wherein upper and lower stadia index providing strips 105 and 106 are socketed. The respective facing end surfaces 105ª and 106ª thereof are in spaced parallel planes equi-distant from the pivot center 107 of the member C. The facing plane surfaces 105ª and 106ª are not mere lines. They have a substantial width or thickness. The foremost edges of the surfaces 105ª and 106ª, provide index lines or edges (e) and (f) in the same vertical plane spaced from a vertical plane through the pivot axis of the self levelling stadia member C for a distance 110, shown in Figure 11. Similarily the rear edges or lines (g) and (h) of the stadia planes 105ª and 106ª are disposed in the same vertical plane spaced for a distance 111 from a vertical plane intersecting the pivot center 107 of the self levelling stadia member C.

The stadia member C assumes a position in a vertical plane at any angular position of the instrument, as shown in the full and dot and dash line positions in Figure 3.

In the eye piece 25 there may be positioned a magnifying lens 120 (Fig. 4), preferably segmental in form, supported by bracket arrangement 121. It is in position to facilitate readings upon the scale strip of the floating dial D with reference to the index 90. Similarly, a magnifying lens 123 may be supported by a bracket arrangement 124 at the opposite side of the casing B in the line of sight of the self levelling stadia member C. The relation of these magnifying lenses with respect to the peep hole is shown in Figures 4 and 5.

This instrument is intended for use with a horizontal base line of fifty feet. The instrument could be adapted for use with a base line of any other predetermined number of feet. For use with a base line of fifty feet the target is preferably marked with white chalk marks vertically spaced upon the target exactly three feet apart, preferably near the base of the object to be measured. The operator takes about fifteen paces away from the target or object and a sight is taken thru the instrument. In this connection care should be taken not to hold the hands over the white translucent eye piece since the light rays passing therethru illuminate the floating dial. The operator steps backward or forward until the stadia space in the sight tube exactly coincides with the two chalk marks upon the target or object. This will give the correct base line. The operator then sights at the base of the object, lining up the lower stadia edge which is visible thru the instrument upon the base of the object, and the reading on the floating dial is noted. The upper stadia edge is then lined up with the top of the object whose height is sought and the dial reading is noted. If the dial reads above and below the zero delineation the two readings are added together. If the readings are all on one side of the zero delineation they are subtracted to obtain the correct reading. If greater heights are to be measured, chalk marks can be placed upon the target six feet apart at the base and the operator can then take thirty paces, say for a base line of one hundred feet. The stadia edges are then lined up to coincide with the six foot chalk marks. Sights at the base and top of the objects are then taken as before and the total added or subtracted, as the case may be. The result is multiplied by two since the dial is graduated to read correctly when using only the three foot stadia readings.

Referring to Figures 10 and 11, if the line of sight thru the instrument is horizontal the stadia surfaces 105ª and 106ª will be horizontal, and the sight lines designated at 130 in Figures 10 and 11, at a vertical plane intersecting the pivot axis 107, will be spaced the same distance as the index surfaces 105ª and 106ª. The four index stadia markings (e), (f), (g) and (h) are used when viewing the target in elevation and depression. The distances 110 and 111 designated in Figure 11 determine the speed with which the index edges open or close on the line of sight, thereby automatically forcing the observer sighting upon the chalk marks upon the target to take a position such that the horizontal distance between the center of the instrument and a vertical plane intersecting the target will equal the established base line distance. The opening or closing of the spacing between the index edges (e), (f), (g) and (h) compels the operator of the instrument to assume the correct base line distance position. The floating stadia space of the self levelling member C closes at correct accelerated speed to compensate for various sight angles above and below the horizontal, up the 50° 13''. It is of course understood that the thickness of the stadia edge producing strips 105 and 106 must be equal to a predetermined amount. This thickness for the present instrument is .0625''. This equals $\tfrac{1}{16}$ of an inch, and thus each of the spaces 110 and 111 measures $\tfrac{1}{32}$ of an inch.

The closing in of the sight edges to narrow the stadia space when viewing in elevation, is shown in Figure 9. Here the index 90 with reference to the scale strip, shows an elevation of 41 plus feet. For this example the stadia index edges (e) and (h) are sighted by the observer upon the target three foot markings in order to establish the proper base line distance of the instrument away from the target, as can be readily gained from the above description.

Various changes in the shape, size, and arrangement of parts may be made in the form of invention herein shown and described without departing from the spirit of the invention or scope of the claims.

I claim:

1. A surveying instrument comprising a casing structure having a telescopic line of sight therethrough, a self-levelling rotary dial provided with scale markings thereon supported by said casing, the scale markings being readable thereon in the line of sight of an operator looking through said instrument, and a self-levelling stadia member pivotally mounted upon the casing structure independent of the mounting of said rotary dial and disposed in the line of sight of an operator looking through said instrument, the stadia member being provided with index surfaces of appreciable width equi-distantly spaced above and below the pivot axis of the self levelling stadia member, each of said surfaces having stadia edges disposed forwardly of a vertical plane thru the pivot axis of the stadia member and also stadia edges rearwardly of the vertical plane thru the pivot axis of the stadia member whereby the stadia space between said edges will narrow when taking angular observations thru said instrument above and below the horizontal.

2. As an article of manufacture a self levelling gravity actuated stadia member comprising a supporting body having an eccentric pivot to self level said body, and stadia index means upon said body defining stadia lines equi-distantly spaced above and below the pivot axis and spaced forwardly of a vertical plane thru the pivot axis and spaced the same distance rearwardly of said vertical plane thru the pivot axis.

3. A surveying instrument comprising a casing having a telescopic line of sight therethru, a self levelling stadia index bearing member pivotally mounted upon said casing in the line of sight of the observer looking thru the instrument disposed on a definite pivot axis, said stadia member having relatively spaced stadia surfaces of predetermined depth in the direction of the line of sight and disposed equally distance above and below the pivot axis of said member, said stadia surfaces being such that each of them provides a forward and a rearward stadia index edge spaced equal distances forwardly and rearwardly of a vertical plane thru the pivot axis of said member.

4. A surveying instrument such as described in claim 3 wherein is disposed a self levelling rotary dial having scale delineations in the line of sight of an observer looking thru said instrument.

5. A surveying instrument for measuring vertical heights and spaces comprising a frame structure having a telescopic line of sight therethru, and a self levelling stadia space providing member pivoted upon a definite pivot axis upon said frame and having four indexes, a pair of which are positioned above a horizontal thru the pivot axis and two of which are positioned below the horizontal plane thru the pivot axis and for the same spaced distance as the two indexes above, two indexes, one of each pair, being positioned in the same vertical plane parallel with the vertical plane thru the pivot axis of the said member and spaced forwardly from said plane, and two indexes, the other of each pair, being positioned in the same vertical plane and to the rear of the vertical plane thru the pivot axis of said member and spaced rearwardly for the same distance as the forwardly spaced indexes.

6. A surveying instrument such as described in claim 5 wherein there is disposed a self levelling scale bearing wheel rotatably mounted upon a definite pivot axis with scale delineations in the line of sight of the instrument.

7. A surveying instrument such as described in claim 5 wherein there is disposed a self levelling scale bearing wheel rotatably mounted upon a definite pivot axis and having a buoyant float eccentrically attached upon the wheel and a body of liquid in which said float is positioned for the self levelling of said wheel and scale.

8. In a surveying instrument the combination of a casing structure having a telescopic line of sight therethrough, a rotary wheel having peripheral scale delineations thereon readable in the line of sight of the instrument, means pivotally supporting said rotary wheel in a liquid within said casing structure, a float eccentrically disposed upon said wheel floating in said liquid for self levelling of the wheel and scale in relation to the observer's line of sight through said instrument, and a self levelling stadia index member pivoted upon said casing structure having designated thereon spaced stadia edges equi-distantly spaced above and below the pivot axis of said index member and equi-distantly spaced forwardly and rearwardly with respect to a vertical plane through the pivot axis of the stadia member.

ROBERT K. VICKERY.

References Cited in the file of this patent

UNITED STATES PATENTS

| Number | Name | Date |
|---|---|---|
| 975,682 | Ferber | Nov. 15, 1910 |
| 1,277,102 | Miller | Aug. 27, 1918 |

FOREIGN PATENTS

| Number | Country | Date |
|---|---|---|
| 9,778 | Germany | May 12, 1880 |

Certificate of Correction

Patent No. 2,652,627 — September 22, 1953

ROBERT K. VICKERY

It is hereby certified that error appears in the printed specification of the above numbered patent requiring correction as follows:

Column 4, line 22, before "scale" insert *black*;

and that the said Letters Patent should be read as corrected above, so that the same may conform to the record of the case in the Patent Office.

Signed and sealed this 10th day of November, A. D. 1953.

[SEAL]

ARTHUR W. CROCKER,
*Assistant Commissioner of Patents.*